Nov. 6, 1962  J. K. ROSE  3,062,917
LIGHT SHIELD AND ADJACENT AREA BRIGHTNESS
INCREASER FOR VIEWING APPARATUS
Filed July 5, 1960  6 Sheets-Sheet 3
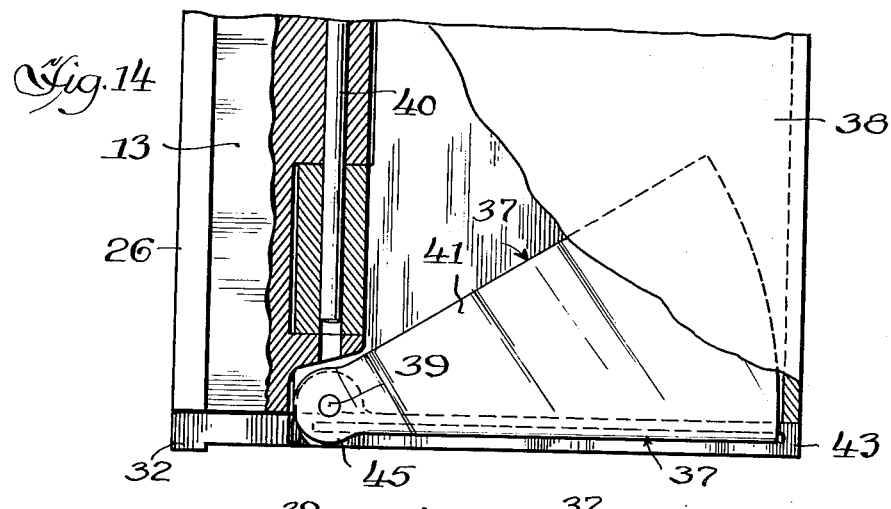
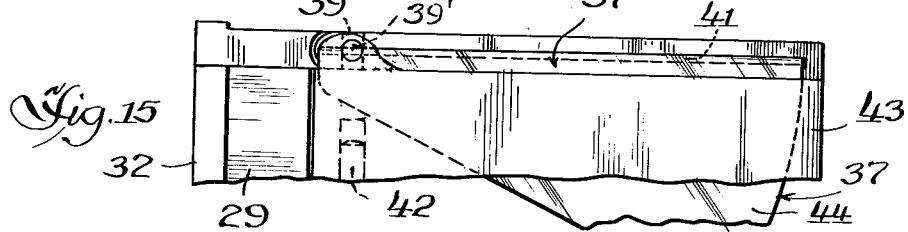
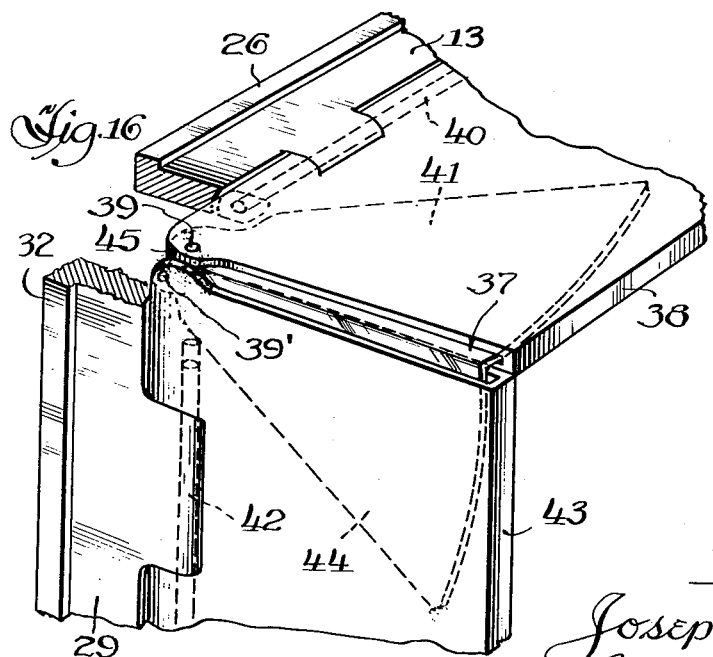
Inventor,
Joseph K. Rose,
Benjamin Schlosser Atty.

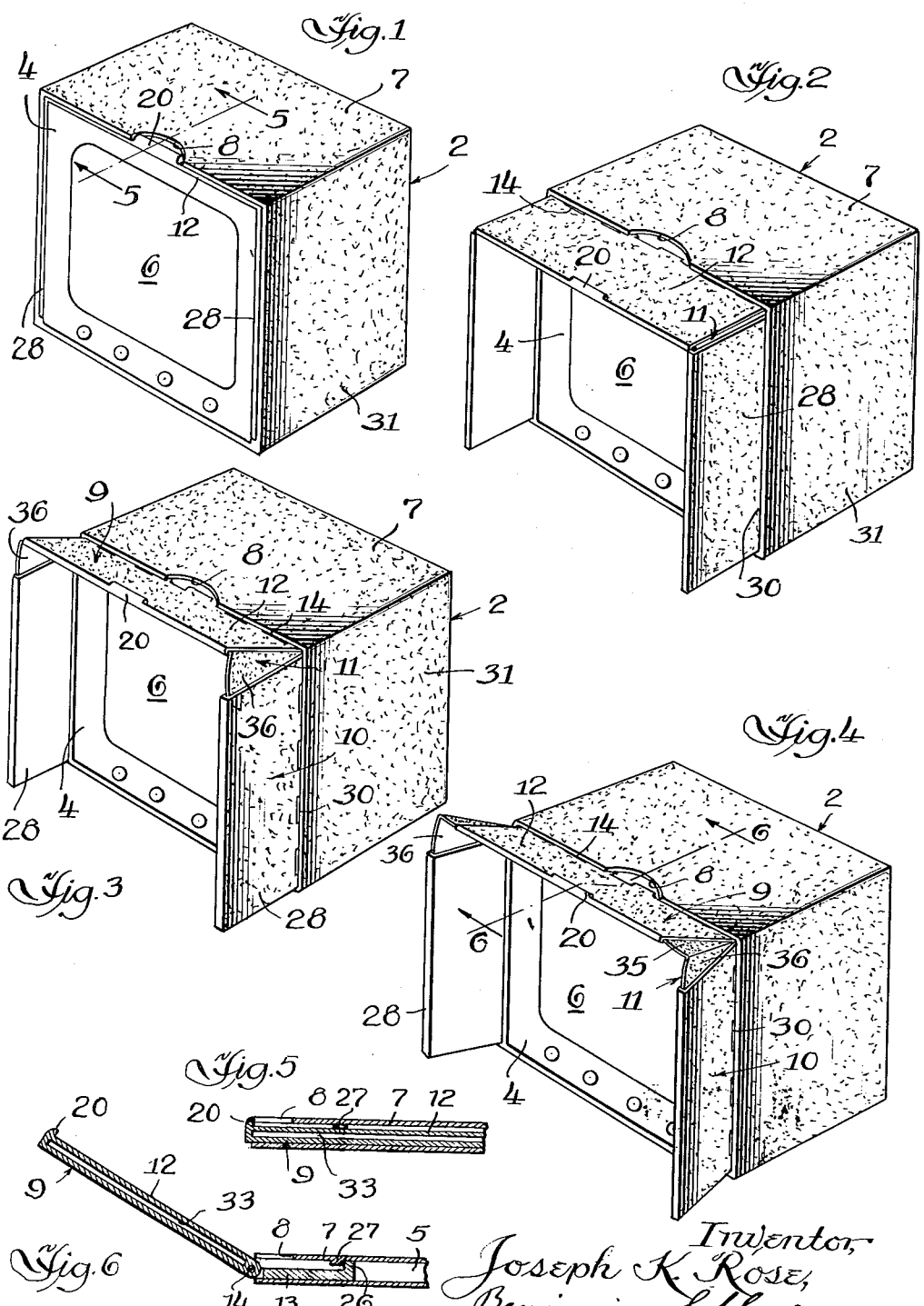

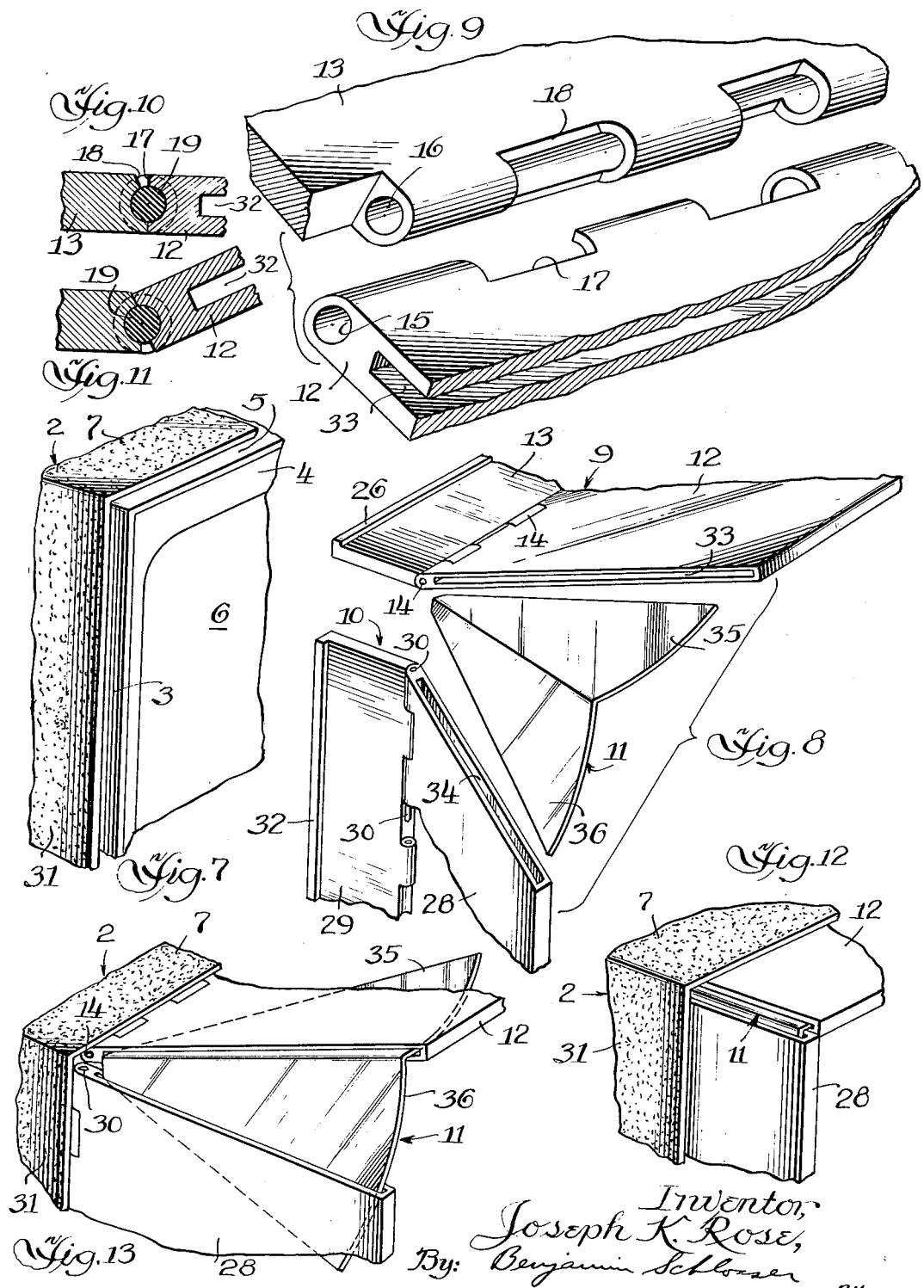

Nov. 6, 1962
J. K. ROSE
3,062,917
LIGHT SHIELD AND ADJACENT AREA BRIGHTNESS
INCREASER FOR VIEWING APPARATUS
Filed July 5, 1960
6 Sheets-Sheet 4
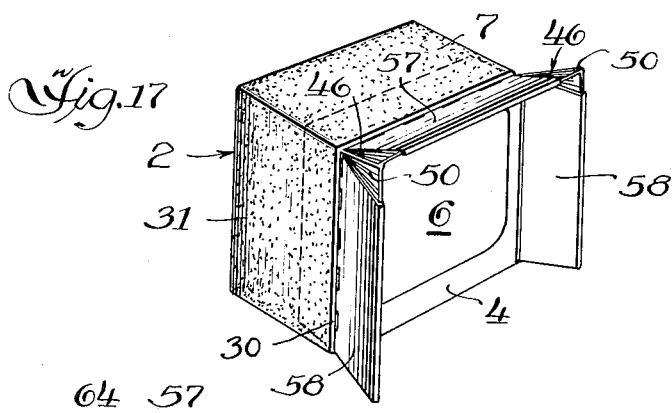
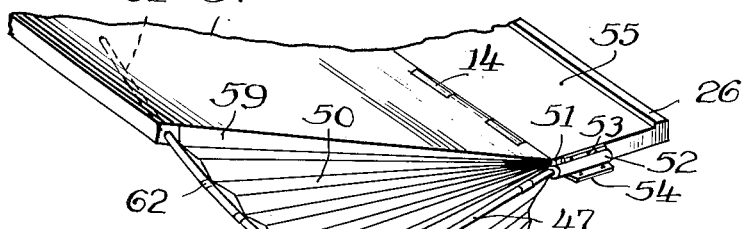
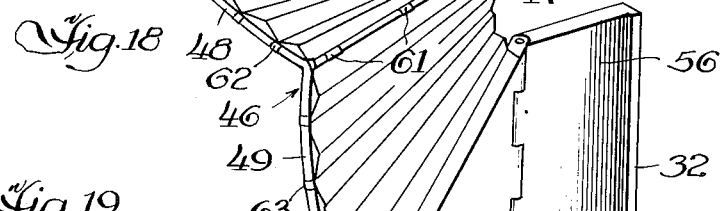
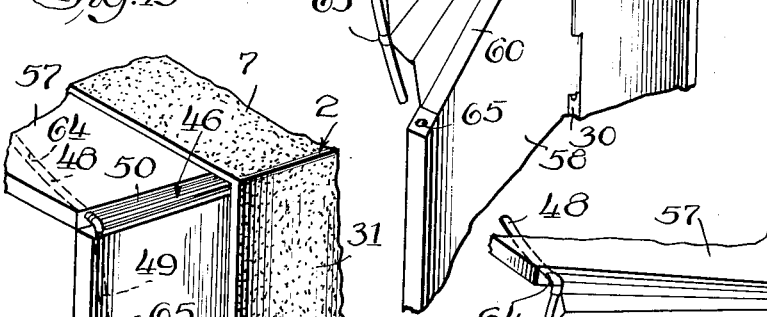
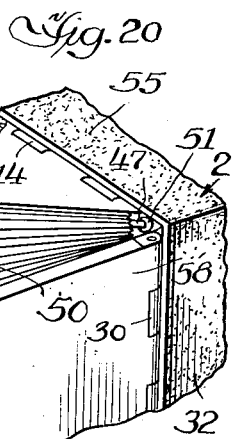
Inventor,
Joseph K. Rose,
Benjamin Schlosser Atty.

Nov. 6, 1962 J. K. ROSE 3,062,917
LIGHT SHIELD AND ADJACENT AREA BRIGHTNESS
INCREASER FOR VIEWING APPARATUS
Filed July 5, 1960 6 Sheets-Sheet 5
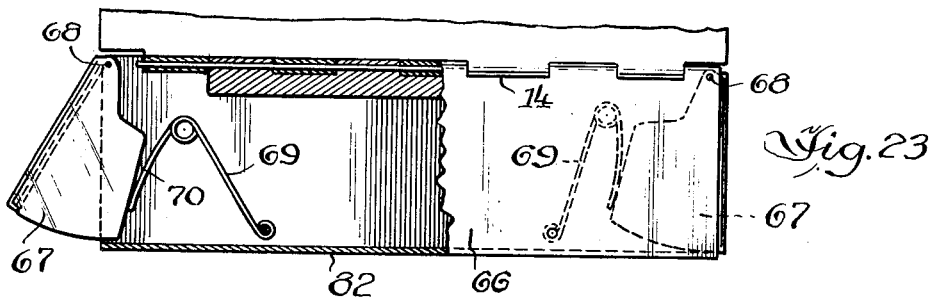
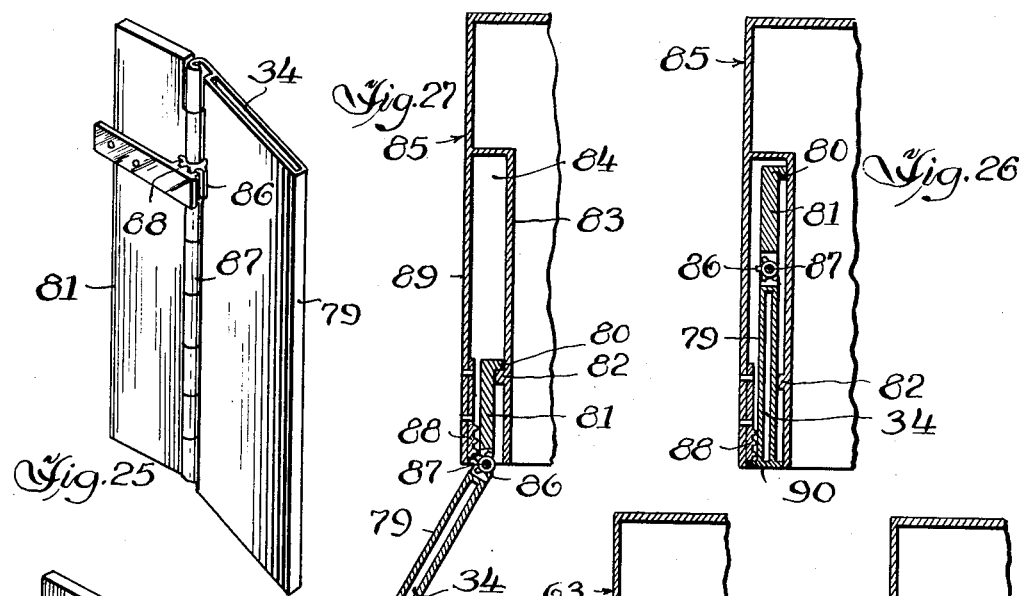
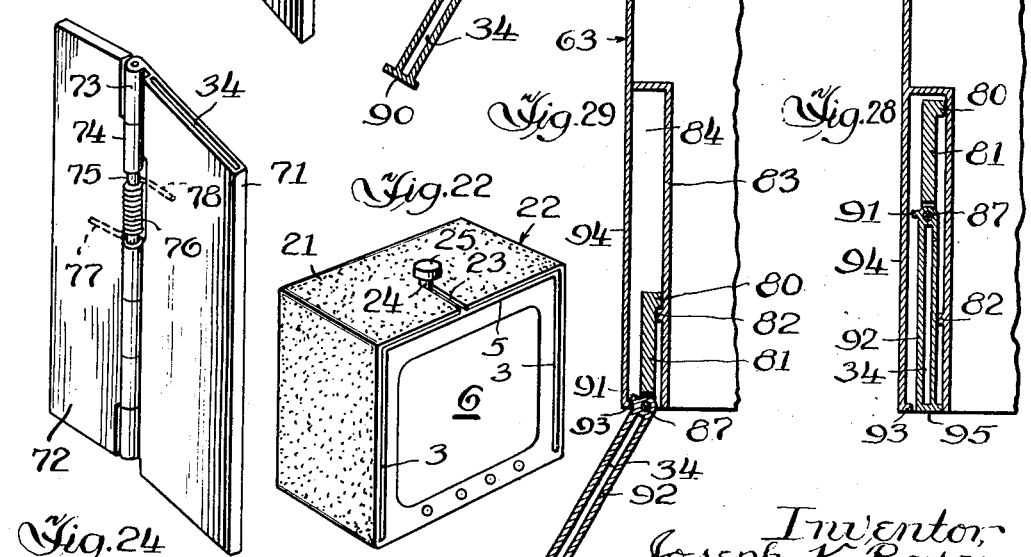
Inventor,
Joseph K. Rose
Benjamin Schlosser
Atty.

Nov. 6, 1962 J. K. ROSE 3,062,917
LIGHT SHIELD AND ADJACENT AREA BRIGHTNESS
INCREASER FOR VIEWING APPARATUS
Filed July 5, 1960 6 Sheets-Sheet 6
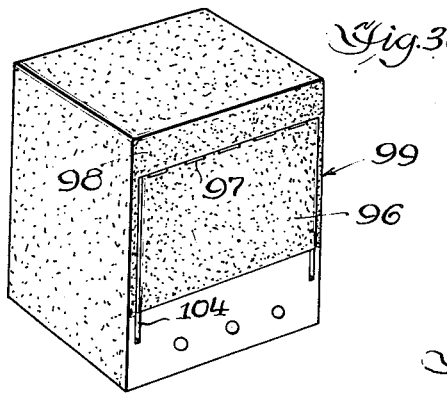
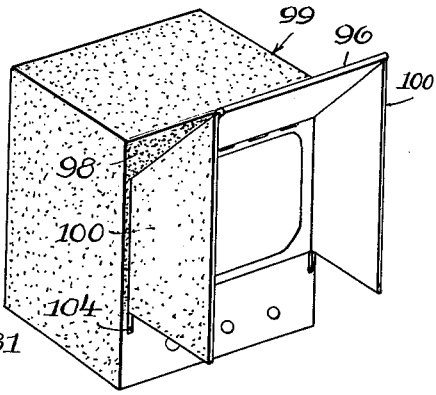
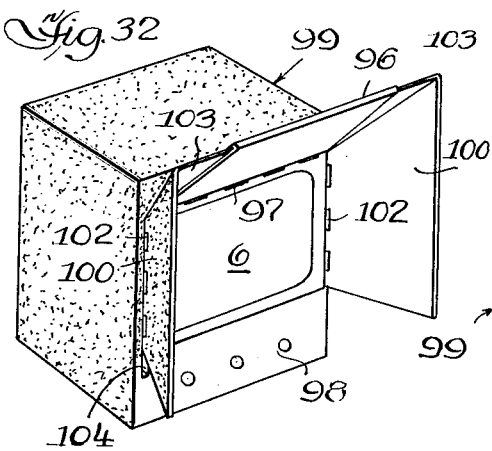
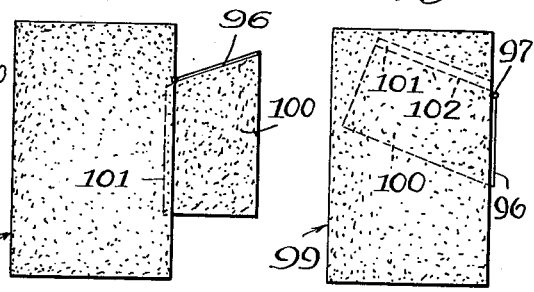
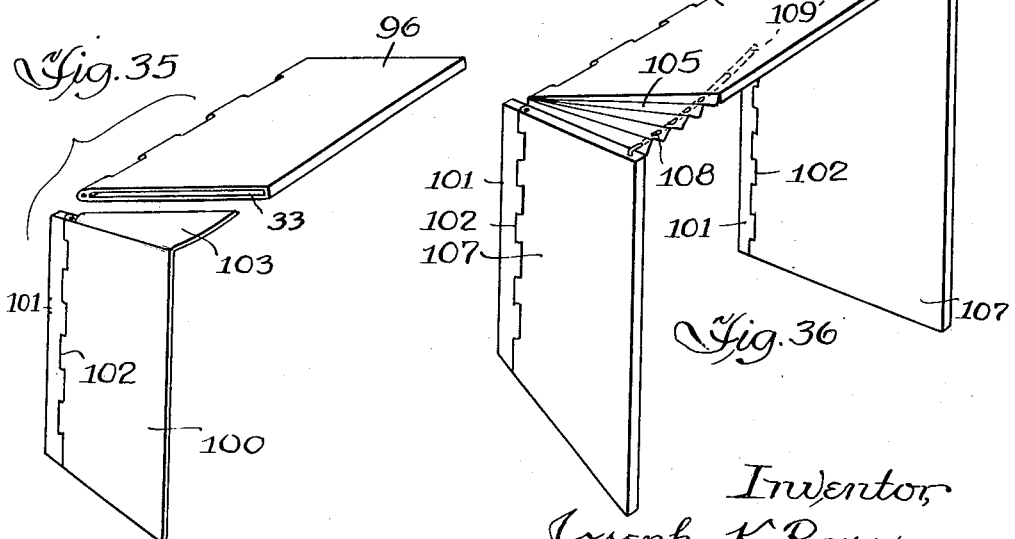
Inventor,
Joseph K. Rose,
Benjamin Schlosser Atty.

3,062,917
LIGHT SHIELD AND ADJACENT AREA BRIGHTNESS INCREASER FOR VIEWING APPARATUS
Joseph K. Rose, 1116 Linden Ave., Highland Park, Ill.
Filed July 5, 1960, Ser. No. 40,739
21 Claims. (Cl. 178—7.91)

The present invention relates to a light shield and adjacent area brightness increaser for viewing apparatus, and is particularly concerned with means for increasing the eye comfort of viewers.

A light shield constructed in accordance with my invention will eliminate most of the detrimental effects of extraneous light by shielding the viewing screen of such apparatus without restricting the useful angle of vision. The inside surfaces of the light shield may be provided with a bright finish to increase the brightness of the area surrounding or partially surrounding, and adjacent to or near the viewing screen to reduce the brightness contrast between this area and the viewing screen.

Although the invention will be described with particular reference to a television receiver, it will be understood that the advantages of the invention may be utilized with various other types of viewing apparatus, such as photograph viewers, oscilloscopes, etc.

The light shield of the present invention may be completely retracted into the cabinet when the television receiver is not in use, and therefore does not detract from the appearance of the cabinet when the light shield is not in its light shielding position.

The light shield generally comprises one horizontal top panel and two vertical side panels. The upper edges of the side panels are adjacent to the outer edges of the horizontal top panel when the light shield is in its retracted position. When the light shield is to be moved into light shielding position the panels are moved forwardly of the front of the cabinet in planes substantially perpendicular to the plane of the viewing screen. After the panels are moved forwardly of the cabinet into light shielding position, they are moved angularly outwardly to provide increased angle of vision relative to the viewing screen. It will be understood that the expression "angularly outwardly" as hereinafter used in the specification and claims refers to the upward angular movement of the top panel as well as to the angular outward movement of the side panels. The angular outward movement of the light shield panels also causes exposure of the inner surface of the light shield to the persons viewing the screen.

Although the drawings show a three sided light shield, it will be understood that the light shield may include another horizontal panel adjacent the bottom of the viewing screen. A four sided light shield employing the same principles of the invention will completely surround the viewing screen. The bottom panel does not have to be moved angularly after the panels have been moved into light shielding position unless the viewing screen is positioned above the eye level of the viewer. A three sided light shield will permit satisfactory and comfortable viewing under most external light conditions because most of the interfering external light reaches the viewing screen from the top and sides. Very little light reaches the viewing screen from below the level of the screen. For convenience, the description will be limited to a three sided light shield.

The light shield assembly, comprising substantially rectangular top and side light shield panels, is moved into and out of the cabinet substantially perpendicularly to the plane of the viewing screen in recesses adjacent the outer walls of the cabinet. This arrangement of the light shield assembly does not require the use of internal cabinet space that is needed for the television chassis.

After the light shield is moved into extended position forwardly of the viewing screen, the light shield assembly is converted into an assembly that is larger in size than the original by moving each of the light shield panels angularly outwardly. The increase in the size of the light shield assembly is effected by the use of opaque corner sections that connect the top and side panels together and change the shape of the panels from rectangular to substantially trapezoidal as the panels are moved angularly outwardly. The angular outward movement of the light shield panels increases the angle of vision. The corner sections provide an opaque, light-tight connection between the top and side panels of the light shield at any position within the angular range of travel of the panels. The top panel is always in 90° relationship to each of the side panels, regardless of the angular position of the panels. The corner sections form extensions of the side panels when the top panel is moved angularly upwardly, and form extensions of the top panel when the side panels are moved angularly outwardly.

Each corner section preferably comprises a unitary member having two legs extending substantially at right angles to each other. The two legs of each corner section are each positioned respectively in recesses in one end of the top panel and in the upper edge of the adjacent side panel to form a mechanical bond between adjacent panels. When any panel is moved angularly outwardly from its extended position forward of the viewing screen, the leg of the corner section positioned in the recess of said panel moves with said panel, and thereby pulls the other leg of the corner section outwardly of the recess in which said other leg is positioned. This movement is reversed when any panel is moved angularly inwardly. A mechanical stop member limits the angular movement of the light shield panels so that neither leg of any corner section can be completely withdrawn from the recess in which it is positioned.

When the top panel is moved forwardly or rearwardly to its extended or retracted position, the corner sections cause all three panels to move together as a unit. In the manually operated types of light shields the panels are grasped at the front edge and manually moved to their straight forward position. The assembly is then moved to its retracted position, preferably by moving the top panel rearwardly. If the light shield assembly of the automatic type is moved rearwardly from its extended and angularly expanded position, the confining edges of the cabinet recesses will move the top and side panels into alignment with the recesses for movement into retracted position. The corner sections may each be a rigid member, or can be made of plastic or other suitable material that will allow a slight degree of flexure. In some embodiments of the invention the corner sections are arranged to move outwardly from the recesses of the light shield panels automatically when the light shield assembly has been moved forwardly out of the cabinet recesses. If desired, a flexible, bellows type corner section may be used.

The inside surfaces of the light shield panels and corner sections may be provided with a light color finish having a high diffuse reflection factor. The inside surfaces of the light shield are exposed to the view of persons viewing the screen when the light shield is in its extended and angularly expanded position. Reflected ambient or room light brightens the inside surfaces of the light shield to minimize the difference in brightness between the viewing screen and the adjacent area.

The structure by means of which the above mentioned and other advantages of the invention are attained is described in the following specification, taken in conjunction with the accompanying drawings showing several preferred illustrative embodiments of the invention, in which:

FIG. 1 is a perspective view of a television cabinet, showing a light shield embodying the invention in its retracted position;

FIG. 2 is a perspective view of the cabinet of FIG. 1, showing the light shield in its extended position;

FIG. 3 is a perspective view, similar to FIG. 2, showing the top light shield panel moved angularly upwardly from its extended position forward of the viewing screen to increase the vertical angle of vision;

FIG. 4 is a perspective view, similar to FIG. 3, with the top light shield panel remaining in its up position, and the side light shield panels moved angularly outwardly to increase the lateral angle of vision;

FIG. 5 is a cross sectional view, taken along the line 5—5 of FIG. 1;

FIG. 6 is a cross sectional view, taken along the line 6—6 of FIG. 4;

FIG. 7 is a fragmentary perspective view of a corner portion of a television cabinet showing the recesses for housing the light shield in its retracted position;

FIG. 8 is a fragmentary perspective view showing a top panel, a side panel, and a corner section of the light shield in disassembled relationship;

FIG. 9 is an enlarged fragmentary detail perspective view showing the hinge structure of a top light shield panel in disassembled relationship;

FIG. 10 is an enlarged fragmentary cross sectional view of the hinge with both portions of the top panel in coplanar relationship;

FIG. 11 is an enlarged fragmentary sectional view, similar to FIG. 10, with the outer portion of the top panel in raised position, showing the stop member for limiting the angular movement of the top panel;

FIG. 12 is a fragmentary perspective view of a cabinet with the top and side panels partially extended;

FIG. 13 is a fragmentary perspective view of a cabinet with the top panel in raised position;

FIG. 14 is an enlarged fragmentary view, partly in section and partly in elevation, of a structure in which the corner sections are pivoted to the top and side panels;

FIG. 15 is a fragmentary top plan view of the top and one side panel of the structure of FIG. 14;

FIG. 16 is a fragmentary perspective view of the light shield structure shown in FIG. 14;

FIG. 17 is a perspective view of another embodiment of the invention in which the corner sections are bellows, showing the light shield in viewing position;

FIG. 18 is a fragmentary perspective view showing the top panel and a side panel of the light shield of FIG. 17 in partially assembled position;

FIG. 19 is a fragmentary perspective view of the cabinet of FIG. 17 showing the light shield in partially extended position;

FIG. 20 is a fragmentary perspective view, similar to FIG. 19, showing the top panel in its raised position;

FIG. 21 is an enlarged fragmentary perspective detail, showing the ball and socket connection for the rear end of the center rod of the corner section of the structure of FIGS. 17 to 20;

FIG. 22 is a perspective view of another embodiment of the invention in which the light shield is moved forwardly from its retracted position by a pin projecting upwardly through a slot in the top wall of the cabinet;

FIG. 23 is a top view, partly in elevation and partly in section, of a top panel having springs adapted to automatically move the side panels angularly outwardly when the light shield has been moved forwardly to its extended position;

FIG. 24 is a detail perspective view showing a spring for automatically moving the side panel angularly outwardly when the light shield has been moved forwardly to its extended position;

FIG. 25 is an enlarged detail perspective view of a side panel, showing a rack and pinion for automatically moving the side panel angularly outwardly as it is moved forwardly near the end of its extended position;

FIG. 26 is a fragmentary cross sectional view of the mechanism of FIG. 25 in retracted position within the cabinet;

FIG. 27 is a fragmentary cross sectional view, similar to FIG. 26, showing the side panel in its extended and angularly expanded position;

FIG. 28 is a fragmentary cross sectional view, similar to FIG. 26, showing another panel structure that is automatically moved angularly outwardly when the light shield is moved forwardly near the end of its extended position;

FIG. 29 is a fragmentary cross sectional view, similar to FIG. 28, showing the panel in its extended and angularly expanded position;

FIG. 30 is a perspective view of another embodiment of the invention in which the top panel of the light shield is hinged to swing downwardly to serve as a cover for the viewing screen when the television set is not being used;

FIG. 31 is a perspective view, showing the light shield of FIG. 30 in extended position;

FIG. 32 is a perspective view, showing the light shield of FIG. 31 with the side panels moved angularly outwardly from their extended position;

FIG. 33 is a side elevational view, showing the light shield of FIG. 30 in dotted lines, indicating its retracted position;

FIG. 34 is a side elevational view, showing the light shield of FIG. 30 in the extended position of FIG. 31;

FIG. 35 is a detail perspective view, showing the top panel and one side panel of the embodiment of FIGS. 30 to 34 in disassembled relationship; and FIG. 36 is a detail perspective view of a light shield similar to the light shield of FIGS. 30 to 35, except that it has a bellows type corner section.

Referring to FIGS. 1 to 16 of the drawings, a television cabinet having a light shield adapted for manual operation is shown. In this embodiment a cabinet 2 is provided with a vertically extending recess 3 adjacent each end of its front wall 4 and a horizontally extending recess 5 adjacent the upper edge of said front wall. The recess 5 connects the upper ends of the recesses 3 to form, in effect, a single U-shaped recess surrounding three sides of the viewing screen 6. A notch 8 is provided in the front edge of the top wall 7 of the cabinet, preferably at its longitudinal center, to facilitate forward movement of the light shield from its retracted position within the cabinet. A recess similar to the recess 5 may be provided adjacent the bottom edge of the front wall of the cabinet to form a continuous rectangular recess completely surrounding the viewing screen if a four sided light shield is desired. The recess may be formed by securing an outer shell to the cabinet at the rear of the top, bottom and sides of the cabinet at or near the rear wall of the cabinet.

The light shield comprises a top assembly 9, two side assemblies 10, and two corner sections 11. The top assembly includes a top panel 12 hinged to a top rear panel 13, as indicated at 14. The hinge structure is shown in detail in FIG. 9. Longitudinal bores 15 and 16 are provided in panels 12 and 13, respectively, adjacent the hinge edge of each. Complementary notches 17 and 18 are formed in said panels so that the projecting portion of each of said panels may fit into the notches of the other to align the bores 15 and 16 for the reception of a hinge pintle 19.

The notches 17 are of semi-circular transverse configuration, as shown in FIG. 10. The notches 18 are cut back approximately an additional 25 or 30°. The notches on each panel are of uniform depth, and are so arranged that when the panels 12 and 13 are coplanar the lower longitudinal edges of the notches abut each other in a plane perpendicular to the coplanar plane of the panels, while the upper longitudinal edge of each notch 18 is spaced approximately 25 or 30° from the upper longitudinal edge of the notches 17. This arcuate spacing of the upper longitudinal edges of the notches permits the panel 12 to be moved pivotally upwardly 25 to 30° about the hinge 14 when the panel has been moved forwardly in the recess 5 far enough to provide the necessary clearance.

The abutment of the upper longitudinal edges of notches 17 and 18 when the panel 12 is moved pivotally upwardly 25 or 30° limits the pivotal movement of the panel to the predetermined angularity. The hinge 14 has sufficient friction to hold the panel in any angular position to which it may be moved.

The top panel 12 is provided with a handle 20 to facilitate the forward movement of the panel. The handle is illustrated, in FIGS. 1 to 6, in the form of an upstanding lip integral with the front edge of the panel and aligned with the notch 8, but any suitable handle may be provided. In FIG. 20 another form of handle is shown. In this figure the top wall of a cabinet 22 is provided with a slot 23, and a pin 24, projecting upwardly from the top rear panel through said slot, has a knob 25 secured thereto for facilitating the forward movement of the top panel in the recess 5.

In FIGS. 5 to 8 I have disclosed one form of mechanical stop means for limiting the forward movement of the top panel in its recess. The stop means illustrated comprises a longitudinally extending rib 26 projecting upwardly from the rear edge of the top rear panel 13 and an internal shoulder 27 projecting downwardly into the recess 5. The shoulder 27 is located rearwardly of the front edge of the top wall 7 at such a distance that when it is engaged by the rib 26 the hinge 14 is aligned with the front edge of the top wall 7, and the top panel 12 has enough clearance so that it can be moved pivotally about the hinge 14. Any interengageable projections on the top of panel 13 and the inner surface of top wall 7, or any other suitable mechanical stop means may be substituted for the rib 26 and shoulder 27.

Each side assembly 10 comprises a side panel 28 hinged to a side rear panel 29, as indicated at 30. The hinge 30 is essentially a duplicate of hinge 14, and will not be described in detail, except to state that the recesses of hinge 30 are arranged to permit the side panel 28 to move pivotally between a position coplanar with the panel 29 and a position 25 or 30° outwardly of the adjacent side wall 31 of the cabinet 2. After the light shield has been moved forwardly to its extended position, as shown in FIG. 2, the front edge of any panel may be grasped and manually moved angularly outwardly to provide a suitable angle of vision for the viewing screen. When it is decided to move the light shield to retracted position, each panel is manually moved back to its original extended position forwardly of the viewing screen, and the top panel is then moved rearwardly to move the complete light shield assembly to its retracted position within the cabinet.

It is preferred to provide each side rear panel 29 with an outwardly projecting rib 32 adapted to engage a shoulder (not shown) similar to shoulder 27 simultaneously with the engagement of the rib 26 and shoulder 27. The ribs 32 and cooperating shoulders are not strictly necessary, but are preferred because of the added stability they give to the side panels in their extended position. A ball bearing raceway (not shown) may be provided in the bottom of each vertical recess 3 to facilitate movement of the side assemblies 10.

The top panel 12 is provided with a recess 33 extending inwardly from each end, and side panels 28 are each provided with a similar recess 34 extending downwardly from its upper edge. Each corner section 11 comprises a horizontal leg 35 and a vertical leg 36 perpendicular thereto. The corner sections are opaque, and may be made of metal, plastic, or any other suitable material. The legs 35 and 36 are each approximately triangular, and are positioned in the recesses 33 and 34, respectively, with the apex of each triangle adjacent the hinges 14 and 30. The legs 35 and 36 are slightly shorter than the top and side panels. The outer end of each leg is arcuate to permit movement of the corner sections into and out of the recesses. When the panels are moved angularly outwardly, the corner sections form opaque connections between adjacent light shield panels. The corner sections fit loosely in the recesses 33 and 34, but may be pivotally secured, as hereinafter described.

The corner sections 11 form a mechanical bond between the top panel and the side panels 28. Whenever the top panel 12 is moved forwardly or rearwardly the corner sections cause each side panel to move the same distance in the same direction. When the top panel 12 is moved pivotally upwardly, the vertical leg 36 moves angularly upwardly in its recess 34, and when either side panel 28 is moved angularly outwardly, the horizontal leg 35 of the corner section adjacent said side panel moves angularly outwardly in its recess 33. The legs 35 and 36 are each of sufficient width so that they cannot be withdrawn completely from their respective recesses whenever the top or side panels are moved angularly outwardly the 25° or 30° permitted by the hinges 14 and 30.

It will be noted that no part of the light shield assembly can be moved angularly until the hinges 14 and 30 are substantially aligned with the front edge of the cabinet. In other words, the entire movement of the top panel 12 within the cabinet is parallel to the top wall 7, and the corresponding movement of the side panels 28 is parallel to the side walls 31. The restriction of the movement of the light shield within the cabinet to movement parallel to the adjacent walls of the cabinet minimizes the amount of space required within the cabinet for the light shield assembly. The location and the narrow width of the recesses 3 and 5 does not waste any space within the cabinet that is required for the television chassis.

The inner surface of panels 12 and 28 and of corner sections 11 may be of light color and provided with a finish having a high diffuse reflection factor. The mask surrounding the viewing screen and occupying the space between the edge of the viewing screen and the light shield recesses should preferably have a high diffuse reflection. When the panels of the light shield are moved angularly outwardly to increase the useful angle of vision relative to the viewing screen, the surface area that is exposed adjacent to the viewing screen is of increased brightness. This reduces the brightness contrast between the viewing screen and the adjacent area. The shielding of the viewing screen from extraneous light and the elimination of the severe contrast in brightness between the viewing screen and the adjacent area both contribute to the eye comfort of persons viewing the screen.

In FIGS. 14 to 16 I have shown a light shield having its corner sections 37 pivotally secured to the top panel 38 and the side panel 43, as indicated at 39 and 39', respectively. The hinge pin 40, which connects the top panel 38 to a top rear panel 13, is shortened at each end to provide clearance for the apex of the horizontal leg 41 of the corner section that has been extended past the axis of the hinge pintle 40. The hinge pintle 42, which connects the side panel 43 to a side rear panel 29, is shortened at its upper end to provide clearance for the vertical leg 44 of the corner section. The rear ends of the top panel 38 and the upper ends of the side panels 43 have been extended outwardly slightly to provide ears 45 that permit the pivot pins 39 and 39' to be axially aligned with the hinge pintles 42 and 40, respectively. The axial alignment of the pins 39 and 39' with the pintles 42 and 40, respectively, prevents the legs 41 and 44 from binding when the side panel 43 or the top panel 38 is moved angularly outwardly from its extended position. If desired, the corner section may be pivotally secured to only one of the adjacent panels.

The embodiment of the invention disclosed in FIGS. 17 to 21 is substantially the same as that disclosed in FIGS. 1 to 16, except for the construction of the corner sections. The same reference numerals will be used to designate substantially identical structure, and the description of such structure will not be repeated.

The corner section 46 comprises a rigid unit having three rods 47, 48 and 49 extending at right angles to each other, as shown in FIG. 18, and a flexible member 50 in the form of a bellows or fanning partition secured to said rods. The free end of the center rod 47 is swivelled in a ball and socket connection 51 at the front end of a tube 52. The tube is rigidly secured to adjacent edges of the top rear panel 55 and the side rear panel 56. The center rod 47 is not free to swivel in the socket 51 until the light shield assembly is moved forwardly far enough for the hinges 14 and 30 to be substantially aligned with the front edge of the cabinet.

The opposite edges of bellows 50 are permanently secured to adjacent edges of the top panel 57 and the side panel 58, as indicated at 59 and 60, respectively. The center portion of the bellows 50 is secured to the center rod 47 by loops or rings 61, and the outer end of the bellows is secured partly to rod 48 by loops or rings 62, and partly to rod 49 by loops or rings 63. The loops or rings 62 and 63 are slidable on their respective rods so that the bellows may be expanded or closed. The center rod 47 is long enough to permit the flexible bellows 50 to have a length substantially equal to the length of the panels 57 and 58.

The top panel 57 and the side panel 58 have arcuately extending bores 64 and 65, respectively. The rods 48 and 49 are arcuate in planes perpendicular to each other and are slidable in said bores 64 and 65, respectively. The rods 48 and 49 are long enought so that they cannot be completely withdrawn from the bores 64 and 65 when the top panel 57 and side panels 58 are moved angularly outwardly 25 or 30° from the horizontal or vertical plane occupied by said panels in their retracted positions.

The rods 48 and 49 act as a mechanical bond between the top and side panels, so that whenever any panel is moved either forwardly or rearwardly, the other two panels move the same distance in the same direction. After the panels have been moved forwardly to the limit permitted by the ribs 26 and 32 and the cooperating shoulders, the ball and socket joint 51 is aligned with the front of the cabinet. The center rod 47 then moves angularly in a vertical plane with angular movement of the top panel, and angularly in a horizontal plane with angular movement of the side panels. The inner surfaces of panels 57 and 58 and bellows 50 may be provided with a light color finish having a high diffuse reflection factor, as described in connection with the embodiment of FIGS. 1 to 16.

In FIG. 23 I have shown the top panel 66 of another embodiment of the invention in which the top and side panels are moved outwardly about their respective hinges to a predetermined angle of 25 to 30° automatically when the panels are moved forwardly to their extended position. In this embodiment, corner sections 67 are pivoted to the top and side panels, as indicated at 68. A spring 69 has one end 70 urging the corner section outwardly about its pivot 68. When the top panel has been moved forwardly far enough for the corner section to clear the confining edge of the recess, the corner section is moved angularly outwardly by the spring 69, and the vertical leg of the corner section, which extends into a recess in the upper edge of the side panel, moves the side panel angularly outwardly about its hinge at the same time. The top panel is simultaneously moved angularly outwardly by a spring 69 in each side panel.

No binding action occurs as a result of the two forces acting on the corner section as the movements of the top and side light shield panels are completely independent. The corner section provides a sliding connection between the top and side panels, rather than a solid connection. The side panels are always in 90° relationship to the top panel regardless of the angular position of any of the panels.

In FIG. 24 a side panel 71 is hingedly secured to a side rear panel 72. The panels 71 and 72 are provided with axially aligned hinge lugs 73 and 74, respectively, through which a hinge pintle 75 extends. One of the hinge lugs 73 or 74 is omitted, and a coiled spring 76 encircles the hinge pintle 75 in the space provided by omitting the hinge lug. The spring 76 has one end 77 bearing against the panel 72, and the other end bearing against the panel 71, to urge the panel 71 angularly outwardly. As soon as the panel 71 is moved forwardly far enough to allow the corner section to clear the confining edge of the recess, the spring 76 moves the side panel 71 angularly outwardly to a predetermined angularity of 25 to 30° that is controlled by the hinge as with the hinge 14 in the embodiment of FIGS. 1 to 16.

In FIGS. 25 to 27 I have shown a side panel 79 adapted to move angularly outwardly automatically when it is moved forwardly into its extended position. As the panel approaches the end of its forward travel to its extended position, the pinion gear 86, mounted on the hinge 87, engages the rack 88 mounted on the cabinet wall 89. The rotation of the pinion gear moves the panel 79 angularly outwardly. The forward movement of the side panel is limited by the engagement of a rib 80, projecting from a side rear panel 81, with a shoulder 82, projecting from an inner wall 83 of a housing 84. The housing 84 is fixed to one side of a cabinet 85. The position of the shoulder 82 allows the side panel to move forwardly far enough so that the pinion gear turns it angularly outwardly 25 or 30° adjacent the end of its forward movement.

The front end of the rack 88 is spaced rearwardly from the front edge of the wall 89. The side panel 79 is provided with a front wall 90 adapted to fit between the walls 83 and 89 to form a closure for the front end of the housing 84. The front wall 90 is flush with the front wall 4 of the cabinet when the side panel is in its retracted position.

The embodiment of FIGS. 25 to 27 is shown as having recesses 34 in the upper edge of the side panel for the reception of corner sections 11, but may be used with corner sections 37, if desired. I have illustrated only the side panel structure, but it will be understood that the top panel of this embodiment is constructed in a similar manner. The hinge 87 is constructed so as to limit the angular outward movement of the top and side panels to 25 or 30° in the same manner as described in connection with the hinge 14 of the embodiment of FIGS. 1 to 16.

Binding action between the top and side gears will not take place as there is no solid connection between the top and side panels. When the light shield is in its extended position forwardly of the cabinet, the top panel can be moved angularly upwardly, and the side panel can be moved angularly outwardly as though they were not connected in any way. The corner section acts as a sliding mechanical bond between them. A change in the angular position of one of the panels will vary the extension of the corner section from its recess in the other panel, but does not vary the angular relationship between the top and side panels.

The structure of FIGS. 28 and 29 is the same as that of FIGS. 25 to 27, except that the rack and pinion has been replaced by a lug 91 projecting from the rear edge of the side panel and engageable with a lip 93 projecting inwardly from the front edge of the side wall 94. The side panel 92 has a front wall 95 slightly narrower than front wall 99 because part of the front of the housing is closed by the lip 93.

When the side panel is in its extended and angularly expanded position, the side rear panel remains in the vertical recess or housing adapted to receive the side panel in its retracted position. The rear edge of the side panel, which is hinged to the side rear panel, is always in alignment with said recess or housing. As the top panel is moved inwardly toward its retracted position, the corner sections are also forced inwardly. Since the vertical leg of the corner section is positioned in the recess 34 it acts as a mechanical bond between the top panel and the side panel, and pulls the side panel inwardly as the corner section is forced inwardly. Accordingly, the entire light shield may be moved inwardly into the retracted position merely by pushing the top light shield panel rearwardly.

In the embodiment of the invention shown in FIGS. 30 to 35, a front panel 96 is hinged, as indicated at 97, to the front wall 98 of a cabinet 99. The pivotal movement of the hinge 97 is limited in the same manner as described in connection with FIG. 9, to permit the front panel to be moved angularly upwardly about 25 or 30° above the horizontal plane of the hinge. The hinge 97 has enough friction to hold the top panel in its up position. The top panel has sufficient height so that when it hangs downwardly from the hinge 97 it completely covers the front of the viewing screen 6. A recess 33 extends inwardly from each end of the top panel 96.

A side panel 100 is hinged to a side rear panel 101, as indicated at 102. The panel 100 has a horizontal leg 103 bent over at its upper edge to serve as a corner section for the light shield. The leg 103 is approximately triangular, and is movable in the recess 33 as the side panel 100 is moved pivotally about its hinge 102. The angular movement of the side panel 100 is limited so that the light shield corner section 103 can never be completely withdrawn from the recess 33. Accordingly, any movement of the top panel 96 about its hinge 97 causes the side panels 100 to move therewith.

The front wall 98 of the cabinet has a vertical recess 104 adapted to receive the panels 100 and 101. The panels 100 and 101 are so dimensioned that when the top panel 96 is moved angularly upwardly to the limit of 25 or 30° above the horizontal, the hinge 102 is aligned with the front wall 98. This alignment permits the side panel 100 to be moved angularly outwardly to the limit of 25 or 30° permitted by the hinge 102. Although the corner sections 103 may be formed as separate members and secured to the side panels 100 in any suitable manner, it is preferred to make them integral with the side panels. When the top panel 96 is moved downwardly the alignment of the rear edge of the side panel 100 with the recess 104 will cause the side panel to move angularly inwardly into its retracted position.

It will be understood that after the top panel of this embodiment has been lifted upwardly to its up position the side panels may be moved angularly outwardly automatically. This automatic operation may be accomplished by any of the mechanisms described in FIGS. 23 to 29.

As in the other embodiments, the inner surface of panels 96 and 100, and corner section 103 may be light in color and provided with a finish having a high diffuse reflection factor. The top panel 96 may be made of sufficient height so that when it hangs downwardly from hinge 97 it extends all the way to the bottom of the cabinet and covers the entire portion of the front wall between the recesses 104 and below the hinge 97. In this event, the surface of the portion of the front wall between the recesses 104 and below the hinge 97 may be light in color and provided with a finish having a high diffuse reflection factor to match the inner surface of the light shield so that it presents a bright area adjacent the viewing screen when the light shield is extended. The outer surface of the front panel 96 may be provided with a finish to match the finish of the outer surface of the other portions of the cabinet.

The structure of FIG. 36 is similar to that of FIGS. 31 to 35, except that the corner section 103 is replaced by a flexible bellows 105. One end of the bellows is secured to a top panel 106, and the other end is secured to a side panel 107. In this structure, the side panels 107 must be manually moved angularly outwardly after the top panel is lifted upwardly to its fully extended position. This embodiment is not susceptible to automatic operation because the bellows does not have sufficient rigidity. A rod 108, similar to the rod 39, is secured at one end to the upper edge portion of each side panel 107, and its free end is inserted into an arcuate bore 109, similar to the bore 55, in the adjacent end of the top panel 106. The rods 108 act as mechanical bonds to pull side panels 107 angularly out of their recesses when the top panel is lifted angularly into its extended position. When the top panel is about 25 or 30° above the horizontal, the hinge 102 are aligned vertically with the front of the cabinet.

Although I have described several preferred embodiments of my invention in considerable detail, it will be understood that the description thereof is intended to be illustrative, rather than restrictive, as many details may be modified or changed without departing from the spirit or scope of my invention. Accordingly, I do not desire to be restricted to the exact structure described.

I claim:

1. In a cabinet having a front opening and a viewing screen exposed through said opening, a light shield panel, means whereby said light shield panel is mounted for movement in a plane extending angularly to said viewing screen from a retracted position within said cabinet into light shielding position forwardly of said viewing screen, a hinge mounted on said light shield panel, means whereby said hinge permits said light shield panel to move angularly outwardly from said light shielding position to increase the angle of vision relative to said viewing screen, and means for increasing the surface area of said light shield panel when it is moved angularly outwardly.

2. In a cabinet having a front opening and a viewing screen exposed through said opening, a light shield comprising a plurality of light shield panels, means whereby said light shield panels are mounted for movement in planes extending angularly to said viewing screen from retracted positions within said cabinet into light shielding position forwardly of said viewing screen, a hinge on each of said light shield panels, means whereby said hinges permit said light shield panels to move angularly outwardly after they are in light shielding position to increase the angle of vision relative to said viewing screen, a rigid corner section comprising two angularly disposed legs operatively connected to light shield panels, and means whereby angularly outward movement of any light shield panel moves said corner section to increase the surface area of the adjacent light shield panels.

3. In a cabinet having a front opening and a viewing screen exposed through said opening, a plurality of light shield panels, each of said panels being angularly disposed to each adjacent panel, means whereby each of said panels is mounted for movement in a plane extending angularly to said viewing screen from a retracted position within said cabinet into light shielding position forwardly of said viewing screen, a corner section forming a mechanical bond between said adjacent angularly disposed panels whereby movement of one of said panels in said angularly extending plane moves said adjacent panel in a corresponding direction in its angularly extending plane.

4. In a cabinet having a front opening and a viewing screen exposed through said opening, a plurality of light shield panels, each of said panels being angularly disposed to each adjacent panel, a hinge on each of said panels, means whereby said hinges permit movement of said panels at substantially right angles to the plane of said screen from a retracted position within said cabinet rearwardly of said screen into light shielding position forwardly of said screen, said hinges being mounted to permit said panels to move angularly outwardly from said light shielding position to increase the angle of vision relative to said screen, a corner section, means whereby said corner sections forms a light-tight connection between adjoining ends of two adjacent panels, and means whereby said corner section forms a mechanical bond between said two adjacent panels, whereby movement of any panel forwardly or rearwardly causes the adjacent panel to move in the same direction.

5. In a cabinet having a front opening and a viewing screen exposed in said opening, a light shield comprising a plurality of light shield panels, a pair of corner sections, means whereby said pair of corner sections forms mechanical bonds between adjacent light shield panels, means whereby said light shield is mounted for movement as a unit at substantially right angle to the plane of said viewing screen from a retracted position within said cabinet rearwardly of said screen into light shielding position forwardly of said viewing screen, a hinge on each of said light shield panels, means whereby said hinges permit said panels to move angularly outwardly from said light shielding position to increase the angle of vision relative to said viewing screen, and means whereby said corner sections increase the surface area of said light shield when said panels are moved angularly outwardly.

6. In a cabinet having a front opening and a viewing screen exposed through said opening, a light shield comprising a plurality of light shield panels, each of said panels being angularly disposed relative to the adjacent panel, and a corner section, means whereby said corner section is slidably mounted relative to the adjoining ends of adjacent panels, means whereby each of said corner sections forms a mechanical bond between adjacent panels, means whereby said panels are mounted for simultaneous movement substantially at right angles to the plane of said viewing screen from a retracted position within said cabinet rearwardly of said viewing screen into light shielding position forwardly of said viewing screen, a hinge on each of said panels, means whereby said hinges permit said panels to move angularly outwardly from said light shielding position to increase the angle of vision relative to said viewing screen, and means whereby said corner sections each forms a light-tight connection between adjoining ends of adjacent panels in each position of said panels forward of said viewing screen.

7. In a cabinet having a front opening and a viewing screen exposed through said opening, a light shield comprising a plurality of light shield panels, each of said panels being angularly disposed relative to the adjacent panel, means whereby a corner section pivotally secured to one end of at least one of said panels, means whereby said corner section is movably mounted relative to the adjoining end of an adjacent panel to form a mechanical bond between adjacent panels, means whereby said panels are mounted for simultaneous movement at substantially right angles to the plane of said viewing screen from a retracted position within said cabinet rearwardly of said screen into light shielding position forwardly of said viewing screen, a hinge on each of said panels, means whereby said hinges permit said panels to move angularly outwardly from said light shielding position to increase the angle of vision relative to said viewing screen, and means whereby said corner sections each form a light-tight connection between adjoining ends of adjacent panels in each position of said panels forward of said viewing screen.

8. In a cabinet having a front opening and a viewing screen exposed through said opening, a top light shield panel horizontally disposed within said cabinet in retracted position in a plane above said viewing screen, means whereby said top light shield panel is mounted for movement in said horizontal plane between said retracted position and a light shielding position forwardly of said cabinet, a side light shield panel disposed in a vertical plane within said cabinet in retracted position, said side light shield panel being disposed at one side of said viewing screen with its upper edge adjacent one end of said top panel, the upper edge of said side panel and the adjacent end of said top panel each having a recess extending inwardly thereof, a unitary corner section having one leg thereof positioned in each of said recesses to form a mechanical bond between said panels, said mechanical bond causing said side panel to move between its retracted position and its light shielding position with corresponding movement of said top light shield panel, hinges on said top and side light shield panels, and means whereby said hinges permit said top and side light shield panels to move angularly outwardly from said light shielding position to increase the angle of vision relative to said viewing screen.

9. In a cabinet having a front opening and a viewing screen exposed through said opening, a top light shield panel disposed in retracted position within said cabinet in a horizontal plane above said viewing screen, a pair of side light shield panels disposed in retracted position within said cabinet in vertical planes at opposite sides of said viewing screen, each of said side panels having its upper edge positioned adjacent one end of said top panel, unitary opaque corner sections, means whereby each of said corner sections provide a slidable mechanical bond between said top panel and one of said side panels, means whereby said panels are mounted for simultaneous movement from said retracted position to a light shielding position forwardly of said viewing screen, said top panel moving in its horizontal plane and each of said side panels moving in its vertical plane, a hinge on each of said panels, and means whereby said hinges permit separate angularly outwardly movement of each of said panels angularly outwardly from its light shielding position to increase the angle of vision relative to said viewing screen while retaining a continuous opaque light shield around the top and sides of said viewing screen.

10. In a cabinet having a front opening and a viewing screen exposed through said opening, a light shield comprising a plurality of light shield panels, means whereby said light shield panels are mounted for movement in planes extending angularly to the plane of said viewing screen from a retracted position within said cabinet rearwardly of said viewing screen into light shielding position forwardly of said viewing screen, means preventing angular movement of said panels relative to each other rearwardly of said viewing screen, a rear panel adjacent the rear edge of each of said light shield panels, each of said rear panels being located substantially within said cabinet when said light shield panels are in light shielding position, a hinge connecting each of said light shield panels to the adjacent rear panel, means whereby said hinges permit angular movement of said light shield panels relative to each other when said light shield panels are in light shielding position, and means whereby movement of said light shield panels angularly outwardly after they are in light shielding position is effective to increase the angle of vision relative to said viewing screen, the inside surfaces of said light shield panels being exposed to view when said light shield panels are in light shielding position, said inside surfaces of said light shield panels having a high diffuse reflection factor to provide an area of relative brightness adjacent said viewing screen.

11. In a cabinet having a front opening and a viewing screen exposed through said opening, a light shield comprising a plurality of light shield panels, each of said panels being angularly disposed to each adjacent panel, means whereby said panels are mounted to move at substantially right angles to the plane of said viewing screen from a retracted position rearwardly of said viewing screen into light shielding position forwardly of said viewing screen, hinges mounted on said panels, and means whereby said hinges permit said panels to move angularly outwardly from said light shielding position to increase the angle of vision relative to said viewing screen, the inside surfaces of said panels being exposed to view when said panels are in light shielding position, said inside surfaces of said panels having a high diffuse reflection factor to provide an area of relative brightness adjacent said viewing screen.

12. In a cabinet having a front opening and a viewing screen exposed through said opening, a light shield comprising a plurality of light shield panels, each of said panels being angularly disposed to each adjacent panel, a hinge mounted on each of said panels, means whereby said panels are permitted to move at substantially right angles to the plane of said screen from a retracted position within said cabinet rearwardly of said screen into light shielding position forwardly of said screen, a corner section, means whereby said corner section forms a light-tight connection between adjoining ends of adjacent panels, and means whereby said hinges permit said panels to move angularly outwardly from said light shielding position to increase the angle of vision relative to said screen, the inside surface of said panels and said corner section exposed in light shielding position being of light color and having a high diffuse reflection factor to brighten the surface area adjacent said screen.

13. In a cabinet having a front opening and a viewing screen exposed through said opening, a light shield comprising a plurality of light shield panels, each of said panels being angularly disposed to each adjacent panel, a hinge mounted on each of said panels, means whereby said panels are permitted to move at substantially right angles to the plane of said screen from a retracted position within said cabinet rearwardly of said screen into light shielding position forwardly of said screen, a corner section, means whereby said corner section forms a mechanical bond between adjacent panels and a light-tight connection between adjoining ends of adjacent panels, means whereby said hinges permit said panels to move angularly outwardly from said light shielding position to increase the angle of vision relative to said screen, and means whereby said corner section increases the surface area of said light shield when said panels are moved angularly outwardly, the inside surface of said panels and said corner section exposed in light shielding position being of light color and having a high diffuse reflection factor to brighten the surface area adjacent said screen.

14. In a cabinet having a front opening and a viewing screen exposed through said opening, a light shield comprising a plurality of light shield panels, means whereby said panels are mounted for movement from a retracted position within said cabinet rearwardly of said viewing screen into light shielding position forwardly of said viewing screen, a hinge mounted on each of said panels, and means whereby said hinges are mounted to permit said light shield panels to move angularly outwardly after they are in light shielding position to increase the angle of vision relative to said viewing screen, said light shield panels concealing a portion of the front of said cabinet adjacent said viewing screen when they are in said angular light shielding position, the inside surface of said light shield exposed to view when the light shield panels are in said angular light shielding position having a higher diffuse reflection factor than the portion of the front of said cabinet concealed by them to reduce the brightness contrast between said viewing screen and the adjacent area.

15. In a cabinet having a front opening and a viewing screen exposed through said opening, a light shield comprising a plurality of light shield panels, a hinge on each of said panels, means whereby said panels are mounted for movement from a retracted position rearwardly within said cabinet rearwardly of said viewing screen into light shielding position forwardly of said viewing screen, means whereby said hinges are mounted to permit said light shield panels to move angularly outwardly after they are in light shielding position to increase the angle of vision relative to said viewing screen, a unitary corner section linking two adjacent light shield panels and forming a mechanical bond therebetween, and means whereby said corner section is adapted to increase the surface areas of said light shield panels when they are move angularly outwardly, the inside surface of said light shield exposed to view when said light shield panels are in said angular light shielding position having a high diffuse reflection factor to provide an area of relative brightness adjacent said viewing screen.

16. In a cabinet having a front opening and a viewing screen exposed through said opening, a light shield comprising a top panel and side panels adjacent opposite edges of said top panel, means whereby said top panel is movable between a down position in which it covers said viewing screen and an up position in which it extends forwardly of said viewing screen to shield said viewing screen from extraneous light, means connecting said side panels to said top panel, means whereby said last mentioned means moves said side panels into light shielding position relative to said viewing screen when said top panel is moved to its up position, a hinge mounted on each of said side panels, and means whereby said hinges are mounted to permit said side panels to move angularly outwardly relative to said viewing screen after they have been moved to light shielding position to increase the angle of vision relative to said viewing screen.

17. In a cabinet having a front opening and a viewing screen exposed through said opening, a light shield comprising a top panel and side panels adjacent opposite edges of said top panel, means whereby said top panel is movable between a down position in which it covers said viewing screen and an up position in which it extends forwardly of said viewing screen to shield said viewing screen from extraneous light, said side panels each having an angularly disposed extension forming a connection between said side panel and said top panel, means whereby said side panels are movable into light shielding position relative to said viewing screen when said top panel is moved to its up position, a hinge mounted on each of said side panels, means whereby said hinges are mounted to permit said side panels to move angularly outwardly relative to said viewing screen after they have been moved to light shielding position to increase the angle of vision relative to said viewing screen, and means for moving said extensions outwardly of said top panel to increase the surface area of said top panel when said side panels are moved angularly outwardly.

18. In a cabinet having a front opening and a viewing screen exposed through said opening, a light shield comprising a top panel and side panels adjacent opposite edges of said top panel, means whereby said top panel is movable between a down position in which it covers said viewing screen and an up position in which it extends forwardly of said viewing screen to shield said viewing screen from extraneous light, means connecting said side panels to said top panel, said means moving said side panels into light shielding position relative to said viewing screen when said top panel is moved to its up position, a hinge mounted on each of said side panels, and means whereby said hinges permit said side panels to move angularly outwardly relative to said viewing screen after they have been moved to light shielding position to increase the angle of vision relative to said viewing screen, the inside surfaces of said panels having a high diffuse reflection factor to brighten the surface area adjacent said viewing screen.

19. In a cabinet having a front opening and a viewing screen exposed through said opening, a light shield comprising a top panel and side panels adjacent opposite edges of said top panel, means whereby said top panel is movable angularly between a position in which it covers said viewing screen and a light shielding position extending forwardly from the plane of said viewing screen, means extending angularly from each of said side panels, said means connecting each of said side panels to said top panel and forming a mechanical bond therebetween, a hinge mounted on each of said side panels, and means whereby said hinges permit said side panels to move angularly outwardly only after said panels are in light shielding position to increase the angle of vision relative to said viewing screen.

20. In a cabinet having a front opening and a viewing screen exposed through said opening, a light shield comprising a top panel and side panels connected to opposite edges of said top panel, means whereby said top panel is movable between a down position, in which it covers said viewing screen and a portion of the front of said cabinet, and an up position in which it extends forwardly of said viewing screen to shield said viewing screen from extraneous light, and interengaging means on said side panels and said top panel to move said side panels into light shielding position relative to said viewing screen when said top panel is moved to its up position, the inside surfaces of said top and side panels and the surface of said cabinet covered by said top panel in its down position each having a higher diffuse reflection factor than the uncovered surface of said cabinet.

21. In a cabinet having a front opening and a viewing screen exposed through said opening, a light shield comprising a top panel and side panels adjacent opposite edges of said top panel, means whereby said top panel is movable angularly between a down position and a light shielding position extending forwardly of said viewing screen, and integral means extending angularly from each of said side panels, said means connecting each of said side panels to said top panel and forming a mechanical bond therebetween, whereby said side panels are moved into light shielding position by the interengagement of said means and said top panel when said top panel is moved angularly upwardly into light shielding position, a hinge mounted on each of said side panels, and means whereby said side panels move angularly outwardly from said light shielding position to increase the angle of vision relative to said viewing screen, said top panel covering said viewing screen and an adjacent portion of the front surface of said cabinet when it is in said down position, the surface of said cabinet covered by said top panel having a higher diffuse reflection factor than adjacent uncovered cabinet surfaces, said light shield panels concealing portions of the front surface of said cabinet adjacent said viewing screen when in light shielding position, the inside surfaces of said panels having a higher diffuse reflection factor than the surface of the cabinet concealed by said panels when they are in light shielding position.

References Cited in the file of this patent

UNITED STATES PATENTS

| | | |
|---|---|---|
| 2,431,830 | Rose | Dec. 2, 1947 |
| 2,598,072 | Rose | May 27, 1952 |

FOREIGN PATENTS

| | | |
|---|---|---|
| 783,594 | Great Britain | Sept. 25, 1957 |
| 817,271 | France | Aug. 31, 1937 |
| 1,215,848 | France | Apr. 20, 1960 |